July 3, 1928.
F. A. BULLINGTON
1,676,212
INTERNAL COMBUSTION ENGINE
Filed July 12, 1923   3 Sheets-Sheet 1
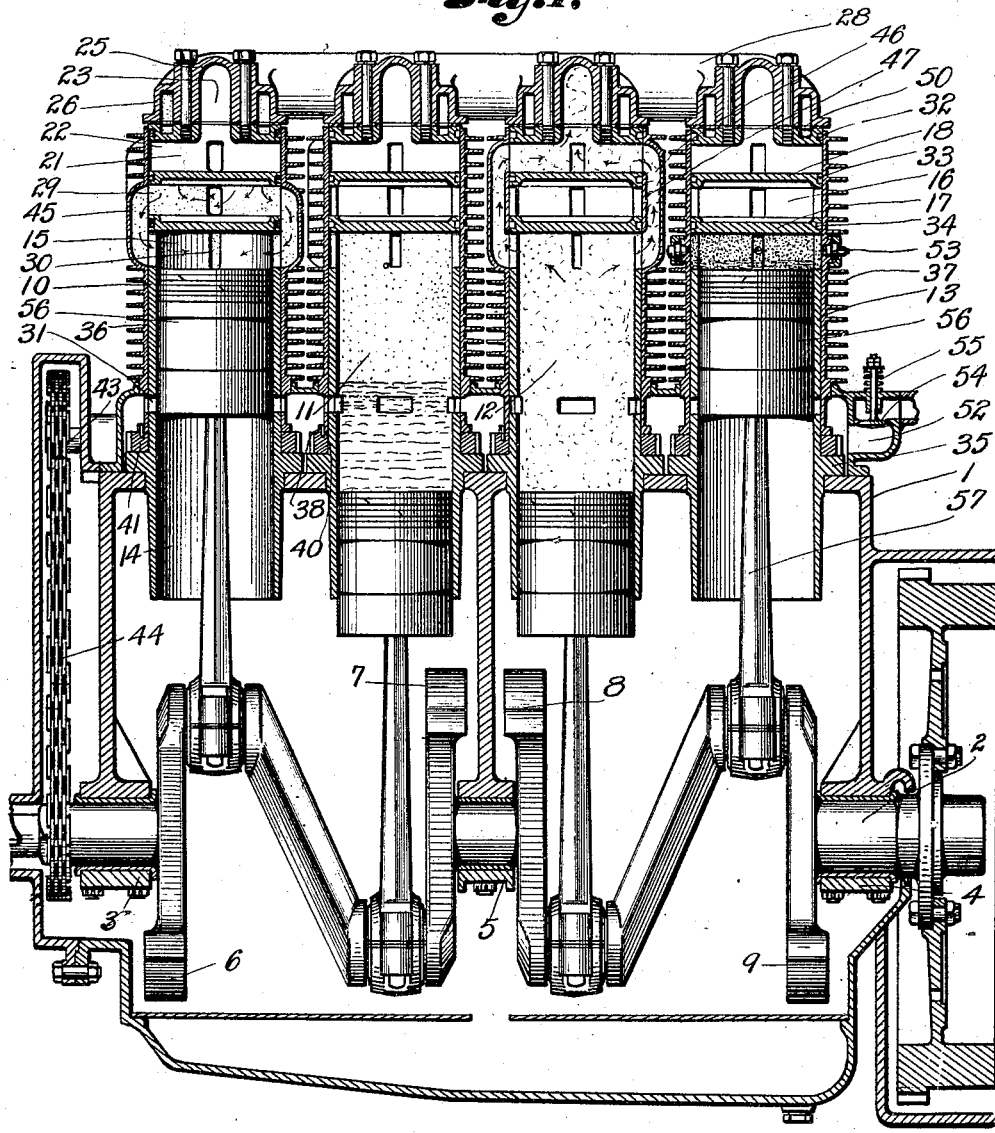
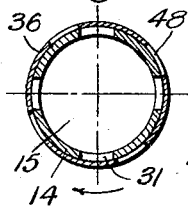 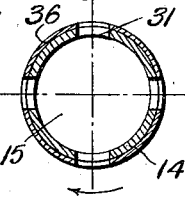 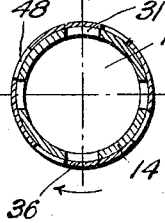 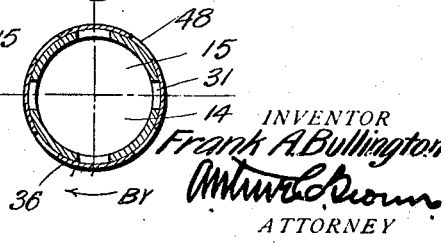

July 3, 1928.　　　　　　　　　　　　　　　　　　　1,676,212
F. A. BULLINGTON
INTERNAL COMBUSTION ENGINE
Filed July 12, 1923　　　　3 Sheets-Sheet 2

INVENTOR
Frank A Bullington
BY
ATTORNEY

July 3, 1928.
F. A. BULLINGTON
INTERNAL COMBUSTION ENGINE
Filed July 12, 1923
1,676,212
3 Sheets-Sheet 3
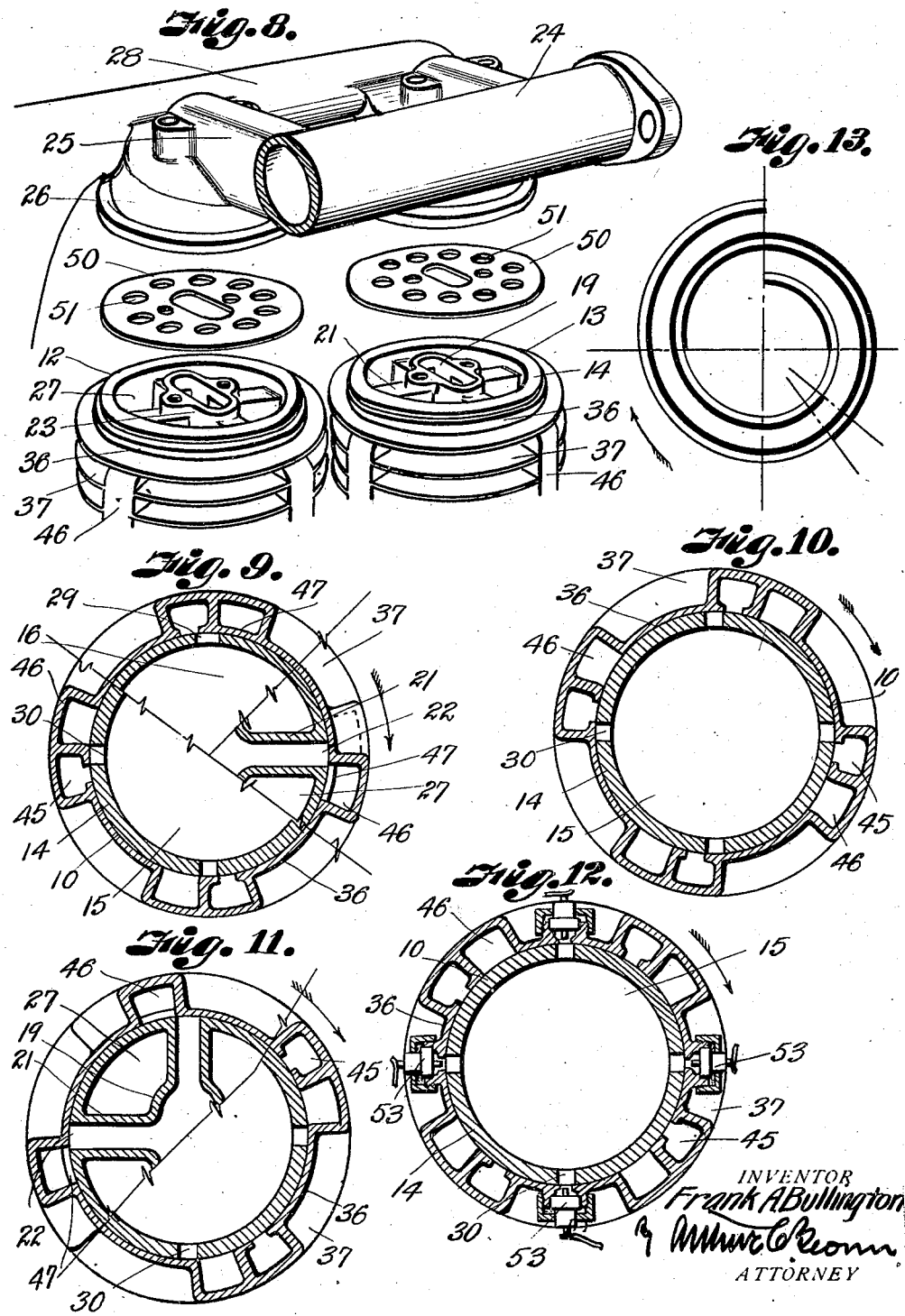

Patented July 3, 1928.

1,676,212

UNITED STATES PATENT OFFICE.

FRANK A. BULLINGTON, OF KANSAS CITY, MISSOURI.

INTERNAL-COMBUSTION ENGINE.

Application filed July 12, 1923. Serial No. 651,043.

This invention relates to internal combustion engines and the primary object thereof is to provide an engine which will possess certain inherent advantages and which will have marked improved efficiency over those engines which are now considered to be standard.

For example I have provided an internal combustion engine in which the expansion action of the working fluid is considerably in excess of the compression ratio of the engine and I have so constructed the engine that there will be a constant compression irrespective of variations in the quantity value of the admitted charge, the constant compression being insured by admitting varying quantities of volumetric fluid into the cylinder, the greater the volume of fuel charge, the lesser the quantity of volumetric fluid and vice versa. In each case however the expansion ratio is greater than the compression ratio so that the full expansion value of the exploded charge may be used to perform useful work.

In carrying out my invention I prefer to employ a sleeve valve which may be movable about the cylinder and which may be provided with the appropriate cuttings whereby fuel inlet ports, fuel exhaust ports and volumetric ports may be controlled in a convenient manner. I have also provided means whereby if one of the valves becomes inoperative, the functional relations of the remaining valves will not be disturbed and I have provided means for pre-heating the fuel charge by causing it to absorb some of the heat from the exhaust gases. Means is also provided for uniformly distributing the fuel over the pre-heating means and causing it to uniformly fill the compression chambers of the engine.

My invention contemplates other novel features and advantages, all of which will be specifically described hereinafter, references being had to the accompanying drawings in which:

Figure 1 is a vertical longitudinal sectional view through an engine constructed in accordance with my invention.

Figure 2 is a cross sectional view through one of the cylinders showing the position of the controlling valve at the beginning of the opening of the air inlet (60 degrees before top dead center of scavenging stroke).

Figure 3 is a similar view showing the air inlet port completely open (at bottom dead center at end of intake stroke and beginning of compression stroke).

Figure 4 shows position of the valve with the air ports closed (6 degrees after top dead center of expansion stroke).

Figure 5 shows the air port closed (at end of expansion stroke and beginning of scavenging stroke).

Figure 8 is a perspective view of the cylinder head, distributor plates and upper end of the cylinder.

Figure 9 is a sectional view on three planes; one through two of the combined intake and exhaust cylinder ports, one through an intake chamber port and one through an exhaust cylinder port showing the exhaust closed and intake at point of opening.

Figure 10 is a sectional view through the cylinder ports showing the intake closed at a point before bottom dead center of the suction stroke.

Figure 11 is a sectional view on two planes showing two cylinder ports and two exhaust chamber ports in a position of opening at a point about bottom dead center at the end of the expansion stroke.

Figure 12 is a sectional view through the cylinder and valve at the cylinder ports showing spark plugs carried by the valve in register with the cylinder ports.

Figure 13 is a diagrammatic view illustrating the position of the valve for opening and closing of intake, exhaust and air ports.

Figure 6:
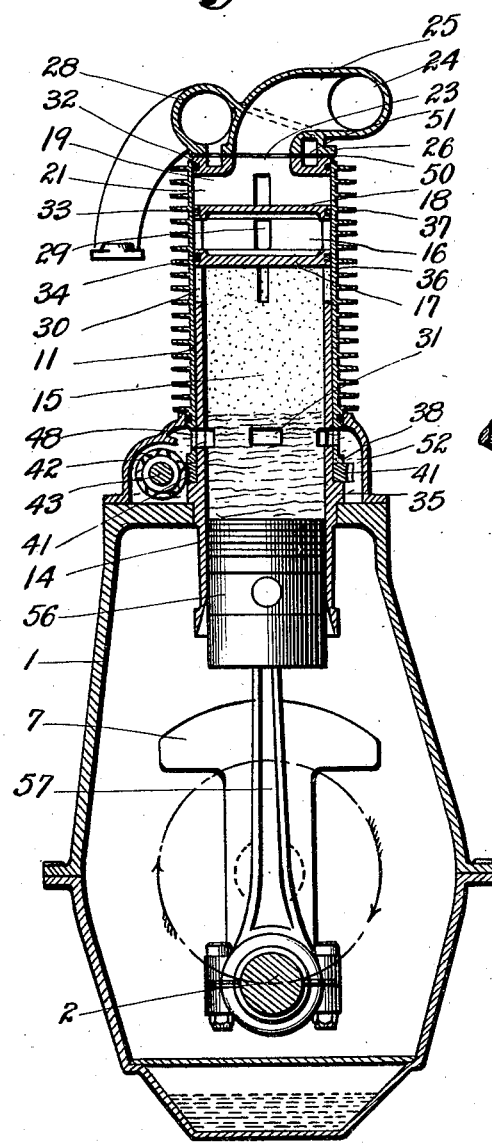
Figure 6 is a vertical cross section through the engine at beginning of up stroke on compression.
Figure 7:
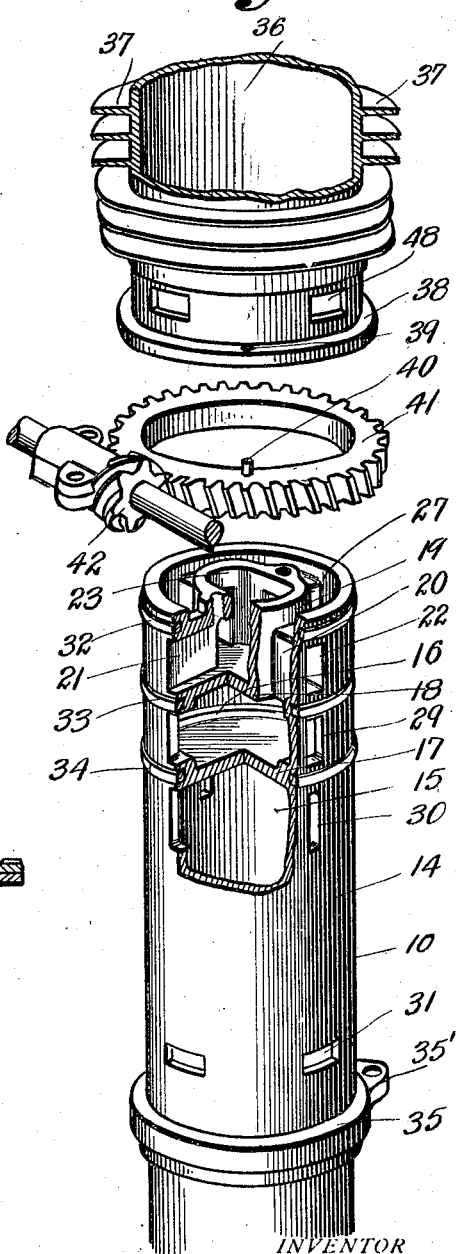
Figure 7 is a disassociated view of the valve operating mechanism and cylinder, the cylinder being broken away to illustrate the intake and exhaust chambers.

I have shown my invention as associated with a four cycle reciprocatory internal combustion motor and hereinafter wherever the word fuel is used it is to be understood that the ordinary fuel mixture is intended and wherever the term air is employed it is to be considered as interchangeable with any volumetric fluid.

Referring now to the drawings by numerals of reference:

1 designates a crank case in which is mounted a crank shaft 2, the crank shaft being shown as supported in bearings 3, 4 and 5 and the crank as counterbalanced by weights 6, 7, 8 and 9. Mounted on the crank case are cylinders 10, 11, 12 and 13 so that the engine is shown as a four cylinder, four cycle type, although the number of cylinders may vary without departing from the generic principle involved. Each cylinder may consist of a tubular member 14 having a main chamber 15 in which compression, ignition and expansion of the fuel takes place. Therefore I will term the portion 15 the working chamber. The top of the working chamber is divided from a fuel chamber 16 by a partition 17. The top of the chamber 16 is formed by a transverse partition 18 which constitutes a deck for supporting an exhaust port member 19 having radial tubular extensions 21 which communicate with openings 22 in the wall of the cylinder, the center portion 23 of the exhaust port communicating with an exhaust manifold 24 (see Figure 8) through a pipe 25 connected to the cylinder head 26. The chamber 16 is in communication with the space 27 surrounding the portion 23 and communicates with the intake manifold 28. The chamber 16 has port cuttings 29 in line with the port cuttings or openings 22 and the working cylinder below the partition 17 is provided with port cuttings 30 aligning with the port cuttings 22 and 29 and at the lower end of the compression portion of the cylinder are port cuttings 31 (see Figure 6). The cylinder is provided with sealing rings 32, 33 and 34, against which may bear a sleeve valve 36. 35 is a bearing flange for the valve operating gear and it has anchoring ears 35' by means of which the cylinder may be fastened to the crank case. The sleeve valve is preferably provided with fins or rings 37 having a high co-efficient of radiation so that the valves may be air cooled. Each valve is shown as provided with a flange 38 having a perforation or opening 39 therein to receive an upstanding pin 40 on a ring gear 41 rotatable about the axis of the cylinder and bearing on the flange 35. The ring gear is shown as of the worm type and it is driven by a worm pinion 42 on a shaft 43, the shaft 43 being driven by a link belt 44, receiving its motion from the crank shaft. It is undertsood of course that one shaft 43 carries as many pinions as is required for the particular number of valve gears of the engine.

Each sleeve valve 36 is provided with four tubular passageways 45, which are of such length that they may communicate the ports 29 with the ports 30 to admit fuel from the chamber 16 to the combustion or working chamber of the cylinder and each valve is provided with four tubular passageways 46 which are longer than the passageways 45 so that the ports 30 can communicate through the pasageways 46 with the ports 22. The passageways 46 are provided intermediate their ends with bridge members 47 which are adapted to close off ports 29 when the ports 30 and 22 are in communication and when ports 29 and 30 are in communication, the ports 22 are closed off by the valve, therefore it will be seen that the ports 30 are both inlet and outlet ports depending upon the relation of the port cuttings of the valve in respect to the inlet or exhaust ports. The lower portion of the valve is provided with port cuttings 48 which are adapted to register with the port cuttings 31 in the cylinder, the port cuttings 31 being at about the bottom of the effective portion of the cylinder for compression but not at the bottom as compared to the expansion of the fluid because while effective compression begins at about the top of the ports 31 due to the fact that the ports are open for part of the compression stroke the expansion continues a considerable distance beyond the ports 31 because during the expansion of the exploded charge the ports 30 will be closed. This will all be explained hereinafter.

By reference to Figure 8 it will be observed that the exhaust portion or that portion of it designated 23 is elongated and at its upper end there is provided a distributing plate 50 having a plurality of perforations 51 by means of which the inlet manifold 28 may communicate with the fuel chamber 16 and since the plate 50 is provided with the perforations it will be apparent that the incoming fuel will be distributed over the effective cross section of the cylinder on its way to the fuel chamber 16 as distinct from passing locally down one side of cylinder since there will be an equal and uniform distribution of the gases over the exhaust port the gases will enter the combustion or working chamber 15 of the cylinder of uniform density at diametrically opposite points or points about 90 degrees apart. Therefore the fuel will enter the working chambers in a strata of uniform density. During its passage from the intake manifold to the fuel chamber 16, the fuel will pass over the exhaust port the latter acting as a stove to heat the incoming fuel before it enters the working chamber. Therefore the fuel enters the working chamber at a uniform density and at a high enough temperature to give the best results when the charge is exploded.

By reference to Figures 2, 3, 4 and 5 it will be observed that the valve is provided with appropriate air port cuttings to allow the air or volumetric fluid to pass through the ports 31. The ports 31 are in communication with a fluid chamber 52 whenever they are uncovered by the valve, it being obvious of course that these ports in any one cylinder are open only on the intake and the compression stroke of the piston, and that during the time of firing and exhausting they are closed.

An important feature of the invention is that the sleeve valves carry the spark plugs 53 and for convenience I may arrange four spark plugs 53 at 90 degrees apart about the cylinder so that when the valves are in position to close off the intake ports at time of explosion, the spark plugs 53 will be opposite the port cuttings 30 so that the ports 30 really serve three functions in that they are inlet ports, exhaust ports and ignition ports. The chamber or manifold 52 may be provided with a valve 54 supported by a spring 55, the spring 55 being sufficient to normally hold the valve 54 seated, but whenever there is a pressure drop in the manifold or chamber 52 sufficient to overcome the spring then the valve will open to allow fresh fluid to pass into the manifold or chamber 52.

Assuming that the parts are properly assembled and that the pistons, 56, are connected to their respective crank arms by appropriate connecting rods, 57; and the engine is turned over, one of the cylinders will first take in the charge, the density of the charge depending upon the position of the throttle valve for if the throttle valve is open, the density will be greater than if the throttle valve is partially closed.

Assuming that cylinder 10 is taking in a charge the exhaust port will be cut off so that the charge will be drawn in through the manifold into the chamber 15 through the passageway 45, the exhaust passageway at this time being closed. As the piston progresses downwardly the intake charge will follow until the passageway 45 moves past the port cuttings 29 and 30. When the piston has moved down to a point to uncover the port cuttings 31 in cylinder 11 it will have reached its full effective intake stroke in so far as the fuel is concerned. A further downward movement of the piston will cause some of the air or volumetric fluid to be drawn in to chamber 15 due to the partial closing of the throttle valve causing a vacuum in the working chamber created by the down stroke of the piston. A further down stroke of the piston draws in an additional amount of the volumetric fluid in the form of a strata to fill the space between the top of port cutting 31 and the top of the now depressed piston until the entire cylinder shown above and below the port cutting is filled with fluid. On the upward or compression stroke of the piston the volumetric fluid taken into the cylinder below ports 31, will be displaced or discharged through ports 31 into the manifold 52 through which it may pass into other cylinders having similar ports 31 adapted to communicate the cylinders with the manifold whenever the pistons are below the ports during the suction and compression strokes of the pistons. When the gas has been compressed to say five atmospheres and combusted the ports 31 will have been cut off from communication with the chamber 52 so that the piston can have a full working stroke for the full length of piston stroke, that is the working or expansion stroke of the piston will be effective during a greater period than the effective compression stroke because compression takes place beginning with the top of port 31 while expansion continues for at least a considerable period longer or until the piston moves as far as the piston in cylinder 12.

I have therefore provided an engine having effective means for maintaining a constant compression pressure irrespective of the quantity of the fuel charge and having a constant expansion stroke the expansion stroke being in excess of the compression stroke, it being apparent that if the throttle valve is partly closed the piston on its intake stroke will create a partial vacuum in its working chamber until the port 31 is uncovered when the incoming volumetrical fluid will restore the pressure in the working cylinder to that of atmosphere but when the throttle valve is open less air may be required to make up the volume for the initial compression.

Attention is called to the fact that the pin 40 may be made of material which will sheer easily therefore in a multi-cylinder engine the valves will be operated from the gears entirely through the pins 40 as the connecting links. Should one of the valves "freeze" to the cylinder or become stuck the gear 41 will continue to turn, sheering off the pin 40 so that the ring gear can move independently of its valve which has become stuck, the result being that the engine will continue to operate as long as the valves for the other cylinder are not stuck. This could not possibly happen if the valves were all fast to their ring gears 41.

Attention is also called to the fact that the sleeve valve constitutes a temperature equalizer. As it rotates about the cylinder it will carry off the heat from the cylinder in a uniform manner so that there will be no one place on the cylinder hotter than another. The importance of this is apparent.

In view of the fact that the volumetric fluid or air is stratified on top of the piston or between the piston and the fuel charge, it will be apparent that when the piston moves on its scavenging stroke all of the burnt gases will be forced out of the cylinder because they will be displaced by the stratified air, consequently complete scavenging of each cylinder will take place for each cycle of operations of each piston. Therefore the introduced fuel will not be impoverished by commingling with products of combustion. This is important because, as will readily be appreciated, the efficiency of the engine will be at its maximum, due in no small measure to the fact that each cylinder will be thoroughly scavenged, so the air functions both as a volumetric fluid and as a thorough scavenging medium.

The advantages gained by providing constant compression in the working chambers of the cylinders are as follows:

I provide a uniform high compression in the cylinders irrespective of the amount of the admitted fuel charge. As a result, the admitted minimum fuel charge will be under the same compression as the admitted maximum fuel charge; consequently the same efficiency will be maintained under all conditions.

Of course, in actual practice a sharp line of demarkation will not be maintained between the fuel and the noncombustible volumetric fluid but it will be maintained for all practical purposes; for example, in that type of motor in which the working chamber of the cylinder has a uniform cross section there is no turbulence in the exploded charge, therefore, the noncombustible volumetric fluid or air strata will not be appreciably disturbed. Hence it will not dilute the fuel mixture nor will it mix with the exploded charge to an extent sufficient to destroy the value of the volumetric air as a scavenging medium.

What I claim and desire to secure by Letters Patent is:—

1. A four cycle reciprocatory internal combustion engine comprising a cylinder provided with a working chamber having means for combusting fuel introduced into said chamber, means for admitting fuel into and exhausting burnt gases from the cylinder and a reciprocatory piston in the cylinder having effective expansion movement greater than its effective compression movement and an effective fuel intake movement equal to the compression movement and less than the expansion movement.

2. A reciprocatory, internal combustion engine, comprising a cylinder and a piston, the cylinder functioning to receive fuel, combust it and exhaust the burnt gases, and a noncombustible volumetric fluid inlet port in the cylinder opening prior to the limit of the effective intake stroke of the piston.

3. A reciprocatory internal combustion engine, comprising a cylinder having a working chamber, an intake chamber and an exhaust chamber adapted to communicate with the working chamber, the working chamber, the intake chamber, and the exhaust chamber being in longitudinal alignment.

4. A four cycle recproratory internal combustion engine comprising a cylinder and a piston, the cylinder having means for receiving fuel, combusting it and exhausting the burnt gases, the engine having a constant compression ratio and a constant expansion ratio, the expansion ratio being greater than the compression ratio and an effective fuel intake movement equal to the compression movement and less than the expansion movement.

5. A reciprocatory, internal combustion engine, comprising a cylinder having a working chamber, an intake chamber, an exhaust chamber adapted to communicate with the working chamber, the working chamber, the intake chamber, and the exhaust chamber being in longitudinal alignment, and valve means surrounding all the above mentioned chambers.

6. A reciprocatory internal combustion engine comprising a cylinder and a piston, the cylinder having means for receiving fuel, combusting it and exhausting the burnt gases and means for introducing a noncombustible volumetric fluid into the cylinder at the end of the effective fuel intake stroke of the piston.

7. A reciprocatory internal combustion engine comprising a cylinder and piston, the cylinder having means for receiving fuel, combusting it and exhausting the burnt gases and a chamber in ported communication with the cylinder adapted to admit noncombustible volumetric fluid into the cylinder at the end of the effective fuel intake stroke of the piston.

8. A reciprocatory internal combustion engine comprising a cylinder and piston, the cylinder having means for receiving fuel, combusting it and exhausting the burnt gases and a chamber in ported communication with the cylinder adapted to admit noncombustible volumetric fluid into the cylinder at the end of the effective fuel intake stroke of the piston and an automatically operated intake valve for the chamber opening in response to drop in pressure in the chamber.

9. An internal combustion engine comprising cylinders and pistons therein, each cylinder functioning to admit a fuel charge, combust it and exhaust the burnt gases, a chamber outside the cylinders adapted to admit noncombustible volumetric fluid into the cylinders at the ends of the effective intake strokes of the pistons and to receive back at least some of the volumetric fluid during the initial compression strokes of the pistons.

10. An internal combustion engine comprising cylinders and pistons therein, each cylinder functioning to admit a fuel charge, combust it and exhaust the burnt gases, a chamber outside the cylinders adapted to admit noncombustible volumetric fluid into the cylinders at the ends of the effective fuel intake strokes of the pistons and to receive back at least some of the noncombustible volumetric fluid during the initial compression strokes of the pistons, the chamber constituting a noncombustible volumetric fluid manifold connected to all the cylinders.

11. An internal combustion engine comprising a cylinder and a piston, the cylinder having means for receiving fuel charges, combusting them and exhausting the burnt gases, and a mechanically actuated valve-controlled means for admitting noncombustible volumetric fluid into the cylinder at the end of the effective fuel intake stroke of the piston.

12. An internal combustion engine comprising a cylinder and a piston, the cylinder having port means for receiving fuel charges, combusting them and exhausting the burnt gases and a rotary valve sleeved about the cylinder, the valve having longitudinal fuel intake and exhaust gas passages and ports alternately coinciding with ports in the cylinder.

13. An internal combustion engine comprising a cylinder and a piston, the cylinder having port means for receiving fuel charges, combusting them and exhausting the burnt gases, and an air-cooled rotary valve sleeved about the cylinder, the valve having longitudinal fuel intake and exhaust gas passages and ports alternately coinciding with ports in the cylinder.

14. An internal combustion engine comprising a cylinder having means for receiving fuel, combusting it and exhausting the burnt gases, a reciprocatory piston in the cylinder, the engine having a constant compression ratio and a constant expansion ratio, the expansion ratio being greater than the compression ratio, and means for admitting a noncombustible volumetric fluid into the compression chamber of the cylinder of the engine at about the limit of the effective fuel intake stroke of the piston in inverse ratio to the fuel admitted to the compression chamber, the volumetric fluid and fuel being maintained in the compression chamber in strata.

15. A reciprocatory internal combustion engine comprising a cylinder and a reciprocatory piston in the cylinder, the cylinder having a working chamber provided with means for admitting fuel, combusting it and exhausting the burnt gases, a volumetric noncombustible fluid inlet port co-operating with the fuel admitted to provide a constant initial volumetric condition in the working chamber of the cylinder at all times irrespective of the amount of fuel actually admitted, the piston having an effective compression stroke less than its full expansion stroke.

16. A reciprocatory internal combustion engine comprising a cylinder and a piston, the cylinder functioning to receive fuel, combust it and exhaust the burnt gases, a noncombustible volumetric fluid inlet port in the cylinder, opening at the end of the effective fuel intake stroke of the piston, the noncombustible volumetric fluid and fuel being admitted in the cylinder in strata prior to ignition.

17. A reciprocatory internal combustion engine comprising a cylinder and a piston, the cylinder functioning to receive fuel, combust it and exhaust the burnt gases, means for introducing a noncombustible volumetric fluid into the cylinder at approximately the end of the effective fuel intake stroke of the piston and for permitting some of the volumetric fluid to escape from the cylinder during the initial compression stroke of the piston to cause the expansion ratio of the engine to be greater than the compression ratio.

18. A reciprocatory, internal combustion engine, comprising a cylinder having a working chamber, an intake chamber, an exhaust chamber adapted to communicate with the working chamber, the working chamber, the intake chamber and the exhaust chamber being in longitudinal alignment, and a perforate fuel diffusing plate in the intake chamber.

In testimony whereof I affix my signature.

FRANK A. BULLINGTON.